(No Model.) 4 Sheets—Sheet 1.

G. MITCHELL.
PRESS FOR EXTRACTING OILS OR OTHER LIQUIDS.

No. 570,491. Patented Nov. 3, 1896.

WITNESSES.
Tom Ning
S. Clark

INVENTOR.
George Mitchell
by W. J. Munden
HIS ATTORNEY.

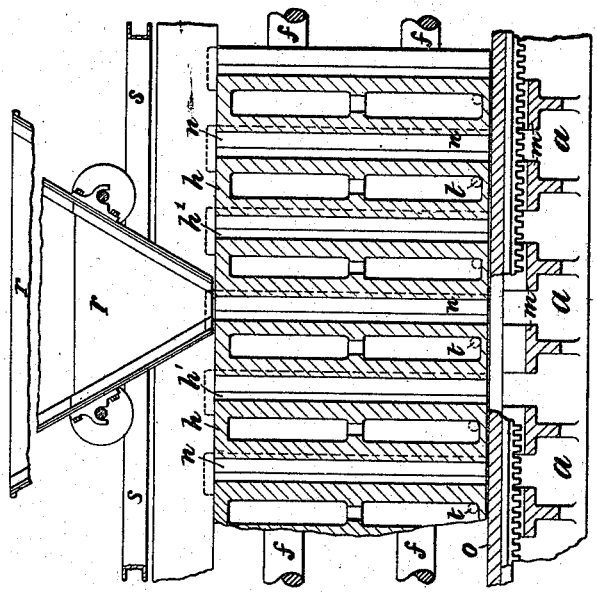
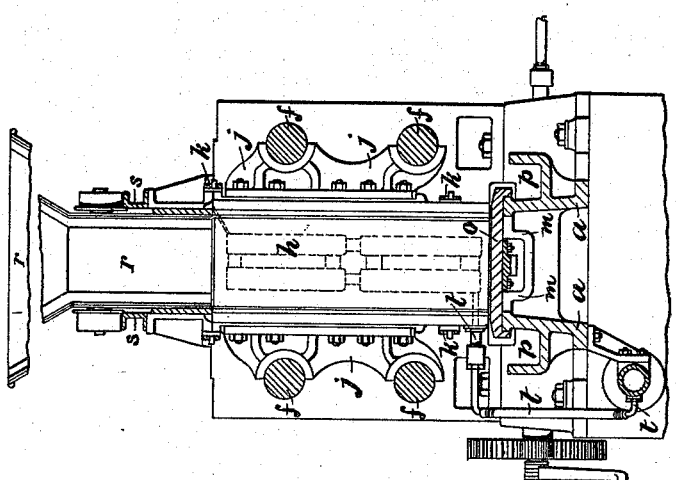

(No Model.)
4 Sheets—Sheet 3.
G. MITCHELL.
PRESS FOR EXTRACTING OILS OR OTHER LIQUIDS.
No. 570,491.
Patented Nov. 3, 1896.
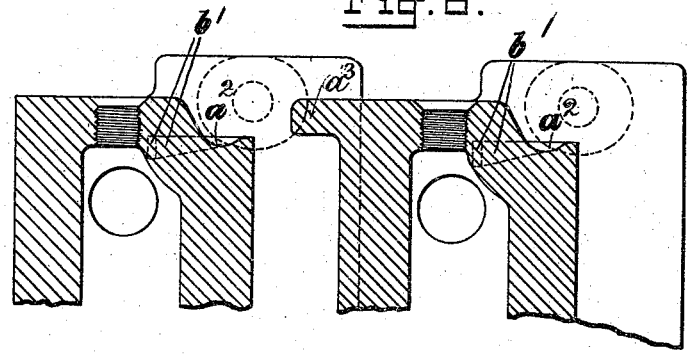
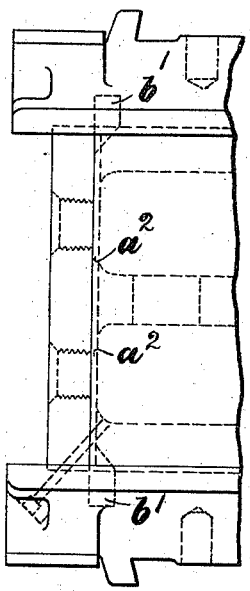
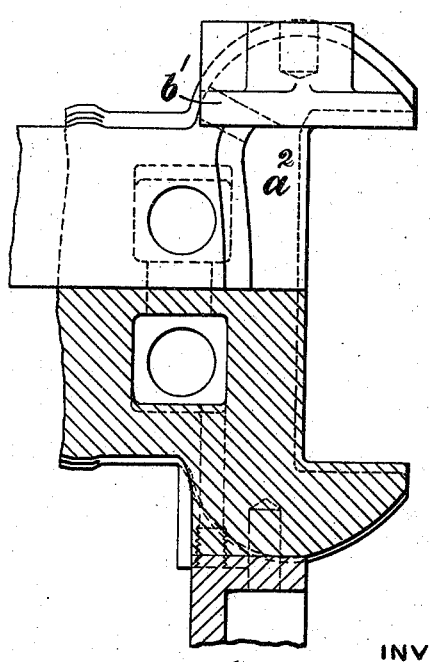
WITNESSES.
INVENTOR.

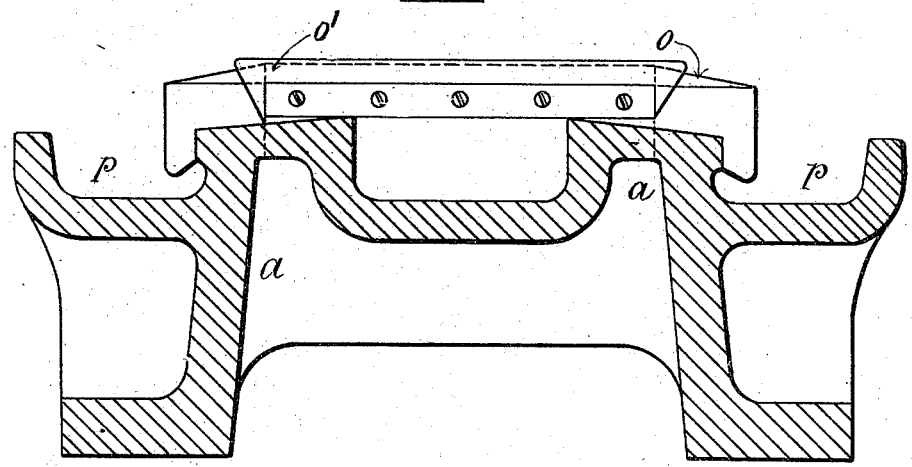

UNITED STATES PATENT OFFICE.

GEORGE MITCHELL, OF LONDON, ENGLAND.

PRESS FOR EXTRACTING OIL OR OTHER LIQUIDS.

SPECIFICATION forming part of Letters Patent No. 570,491, dated November 3, 1896.

Application filed June 1, 1895. Serial No. 551,395. (No model.) Patented in England September 10, 1892, No. 16,259, and in France June 16, 1893, No. 230,897.

*To all whom it may concern:*

Be it known that I, GEORGE MITCHELL, a subject of the Queen of Great Britain, residing at 47 Victoria Street, Westminster, London, in the county of Middlesex, England, have invented certain new and useful Improvements in Presses for the Expression of Oil or other Liquids from Substances Containing the Same, (for which I have obtained a patent in Great Britain, No. 16,259, dated September 10, 1892, and in France, No. 230,897, dated June 16, 1893,) of which the following is a specification.

My invention relates to machines for the expression of oil or other liquid from seeds or other matter containing such liquid, and has for its object the construction and arrangements of parts of such a press whereby the feeding of the seed, manipulation of the machine, delivering of the seed-cake or pressed matter, and speed of operation shall be effected far more efficiently and with greater despatch than in machines constructed up to the present for the purpose.

In order that my invention may be fully understood and readily carried into effect, I will describe the same with the accompanying drawings, reference being had to the letters marked thereon.

Figure 1:
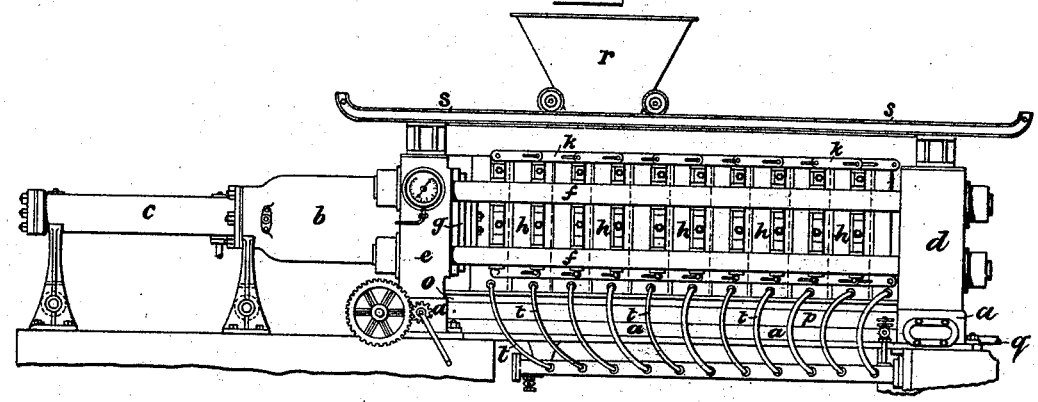
Figure 2:
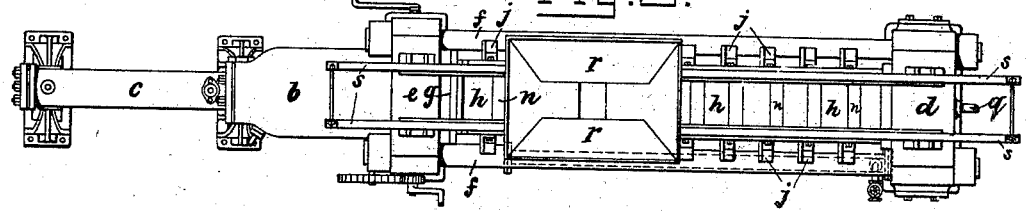
Figure 3:
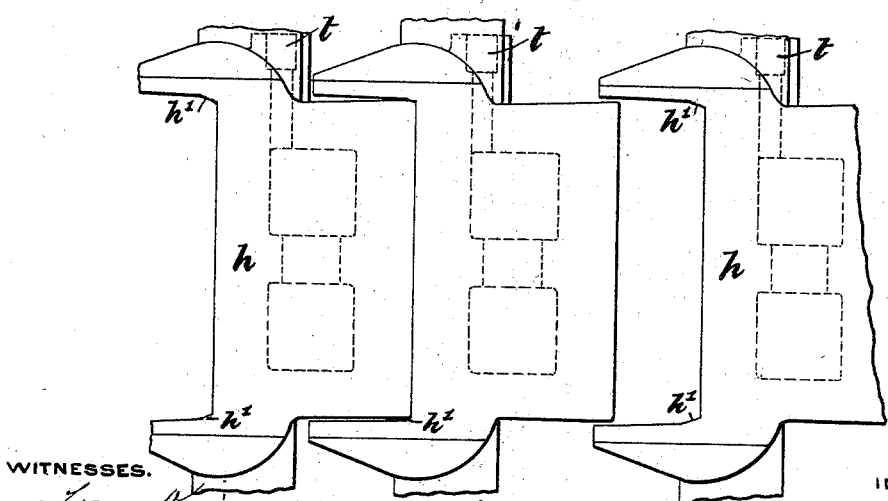

Figure 1 is an elevation, and Fig 2 a plan, of a press according to my invention. Fig. 3 is a cross-section, and Fig. 4 is a longitudinal section, of part of same. Fig. 5 is a plan of press-boxes. Fig. 6 is a vertical section showing a modified form of the upper part of the press-boxes. Fig. 7 is a plan (part section) of same. Fig. 8 is an elevation of part of same. Fig. 9 is a transverse section of plate and a press-box.

Figs. 1 and 2 of the drawings attached show the arrangement of a hydraulic press in full elevation and plan, and is descriptive of a manner by which my invention may be carried into effect, and which consists, first, in the arrangement of the main hydraulic cylinder, ram, and press-boxes so that they work and pressure is applied horizontally; secondly, the form and arrangement of press-boxes, which fit into each other with temporary bottom to form the space for material to be crushed and making the boxes hollow, or providing channels through same, and providing means for supplying a heated or cool fluid, such as steam or cold air thereto; also providing the boxes with special faces to facilitate the delivery of the cake or material pressed; thirdly, in the arrangement of a special feeding appliance, as shown, for the purpose of feeding the seed or material to be pressed from above, and, fourthly, in the arrangement of a special sole-plate having a series of holes, through which the pressed cake or material can pass from the press, and a removable plate to form a temporary bottom to press-boxes, as already referred to, and means for removing same.

By way of illustration I will describe an oil-press operated hydraulically as an example of one way of carrying my invention into effect; but it must be understood that any other medium may be applied for the operation of the press without altering in any extent the seed, or other material, pressing device and without departing from the essence of my invention.

Upon the sole or foundation plate $a$, in elevation, Fig. 1, and in part section, longitudinal, Fig. 4, and cross, Fig. 3, I mount at one end a hydraulic cylinder $b$, having a balance cylinder and ram $c$, attached thereto, to effect the return of the main ram, after it has been forced out from its cylinder during the operation of pressing.

Upon the opposite end of the sole-plate $a$ I mount the head or resistance block $d$ and attach the same to the ram-cylinder block $e$ by direct stays or bolts $f$, preferably four in number, arranged as shown in Figs. 1, 2, 3, and 4 of the accompanying drawings.

Between the resistance-block $d$ and the ram $g$ I arrange the press-boxes $h$, of any required and suitable number, being formed male on one side and female on the other. The boxes engage into one another, as shown on plan, Fig. 5, of the accompanying drawings. The female sides of the boxes at $h'$ are beveled, as shown, to the depth of the approximate thickness of the cake when pressed. The amount of bevel allowed first gives the clearance between the male and female box to allow the oil or other liquid to escape from the material being pressed; second, it allows the cake to more freely leave the box when the press is opened and the temporary bottom plate withdrawn.

The boxes have suitable carrying attachments $j$, by which they are carried and slide upon the stay-bolts, thus keeping them in position one with another.

The opposing faces of the press-boxes are disposed in vertical planes, the first box next the hydraulic cylinder being fixed to and working directly in contact with the main ram. Each successive box in the series is connected by a draw bar or link, preferably as shown at $k$ on the accompanying drawings, such link having at one end an open slot equal to the distance the boxes engage within each other, and which will allow of the boxes being driven close up against one another when they are all more or less near the resistance-block $d$ end of the press. Upon the return stroke the ram, being fixed to the first box, draws it back and the second box is drawn back by the link on the first, and soon the slots in the links being arranged to allow the proper distance between the boxes.

The sole-plate $a$ has a series of holes $m$ through it, disposed directly under the spaces $n$, formed between the boxes $h$ in their extended disposition. The cake that has been pressed is delivered out through these holes in the sole-plate.

To prevent the seed or other material and oil or other liquid from falling through the holes $m$ during the filling of the boxes and while being pressed, I provide a plate $o$, adapted to slide between the sole-plate $a$ and press-boxes $h$, forming a removable bottom to the boxes and retaining the material being pressed.

The liquid expressed during the operation of pressing drains from the boxes onto the plate $o$ and runs off into the channels $p$, one on each side of the press, leading into the oil-receiver under the resistance-block $d$. From thence the oil passes to storage-tanks by the exit-pipe $q$. The plate $o$ can be operated by a rack and pinion or other suitable movement, which may be derived from any convenient source of power.

The feeding of the seed or material to be pressed into the press-boxes is effected by a hopper-trolley $r$, running upon rails or beams $s$ on the upper part of the machine, the orifice of the hopper being so disposed as to deliver the seed or material to be pressed into the empty spaces $n$ as it is drawn along above them. The hopper may be operated in conjunction with the sliding bottom plate $o$, if thought desirable.

The press-boxes $h$ are made hollow, as already described and as per drawings attached, and are provided with connections $t$ for the introduction of hot or cold fluid. The connections $t$ (shown on the accompanying drawings) are of flexible tubing, but equivalently the connection can be formed by means of pipes telescoped or having knuckle, ball, or other suitable joints.

In previous oil-seed-pressing systems it has been necessary to use bags or cloths to contain the material being pressed. My invention obviates the necessity of this by amalgamating or otherwise depositing tin or such other metal on the working faces of the press plate or boxes $h$, so as to obtain a perfectly smooth surface, from which the cake comes freely away.

In Figs. 6, 7, and 8 is shown an improved form of press plate or box in which the male side has a projecting lip or flange $a^3$ formed upon it, which, when two boxes are forced together, fits into and partly fills a corresponding recess $a^2$ in the female side of the adjacent press-box. This recess is so formed with a channel that it receives the oil (which is prevented from escaping by the lip or flange $a^3$) and allows it to flow into passages $b'$ and thence pass off to the channels $p$. The lip or flange $a^3$ closes the opening between two press-boxes and prevents any loss of oil by its squirting out when the pressure is greatest.

Fig. 9 shows an improved form of sole-plate $a$, channels $p$, and removable plate $o$. The sloping surfaces of the plate $a$ insure the running of the drip-oil into the channels when the removable plate is withdrawn. $o'$ is an adjustable scraper screwed on the removable plate for the purpose of leading any oil which adheres to the bottom of the boxes into the drains $p$ when the removable plate is withdrawn, as aforesaid.

The operation of my press is as follows: Presuming the main ram to be drawn back and the press-boxes "open," the hopper, which is open at the bottom, being full of seed or material to be pressed, is drawn along the top, and as it passes over the open spaces between the press plates or boxes they are filled with the seed or material to be crushed, the hopper is drawn back to its original position, and the hydraulic pressure applied from the pumps or accumulators. As the oil or liquid matter is expressed it falls onto the removable plate, and from there falls into the drains or channels in the sole-plate and, further, into the receiving-tanks. The pressure being completed, the ram is withdrawn, and with it at the same time the boxes, leaving the cakes standing loose in the open spaces between the press plates or boxes. The removable plate is withdrawn and the cake falls through the holes in the sole-plate onto an adjustable receiving-table underneath. The removable plate is replaced and the process repeated.

My invention permits advantageously pressing different materials at any required and reasonable temperature, thus, at the normal temperature, or heated, or cooled, by circulating a fluid through the press-boxes, the temperature of such fluid being regulated to any necessary requirement.

Having fully described my invention, what I desire to claim and secure by Letters Patent is—

1. In a press for the expression of oil or other liquids from substances containing the same, and which is arranged to work horizontally, the combination of a framing, one or more rams worked by hydraulic means, a number of press-boxes each having a projecting lip or flange at top which fits into a corresponding recess in the next adjacent press-box, a hopper at the top, a perforated sole-plate and a removable plate, all arranged and operating together in such manner as to allow the substances to be fed in, pressed, the oil to flow into channels, and the cakes from which the oil has been expressed to drop out at the bottom of the apparatus substantially as described and shown.

2. In a press for the expression of oil or other liquids from substances containing the same, and which is worked horizontally, the combination of a framing, one or more rams worked by hydraulic or other means, two or more hollow press-boxes each of which has a projecting lip or flange at top, which fits into a corresponding recess (forming an oil-channel) in the next adjacent press-box, a hopper at the top, a perforated sole-plate, and a removable plate sliding over the same, and closing the spaces between the press-boxes, oil-channels, two or more draw bars or links attached to each press-box, and passages for supplying suitable liquid or fluid to the interior of the hollow press-boxes, substantially as described and shown.

In witness whereof I have signed this specification in presence of two witnesses.

GEO. MITCHELL.

Witnesses:
W. F. BARNES,
F. R. STEVEN.